(12) United States Patent
Harai et al.

(10) Patent No.: US 7,570,550 B2
(45) Date of Patent: Aug. 4, 2009

(54) FOCUS SERVO RECOVERY PROCESSING METHOD FOR OPTICAL DISC DEVICE AND OPTICAL DISC DEVICE

(75) Inventors: Mitsuru Harai, Tokyo (JP); Norimoto Ichikawa, Fujisawa (JP); Nobuhiro Takeda, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 555 days.

(21) Appl. No.: 11/492,922

(22) Filed: Jul. 26, 2006

(65) Prior Publication Data
US 2007/0133363 A1   Jun. 14, 2007

(30) Foreign Application Priority Data
Dec. 14, 2005   (JP) .............................. 2005-360662

(51) Int. Cl.
G11B 7/00   (2006.01)
(52) U.S. Cl. .................................. 369/44.27; 369/53.28
(58) Field of Classification Search .............. 369/44.11, 369/44.27, 44.29, 47.41, 53.28, 53.3
See application file for complete search history.

(56) References Cited

U.S. PATENT DOCUMENTS

| | | | | |
|---|---|---|---|---|
| 7,095,686 B2* | 8/2006 | Ma et al. | .................. | 369/44.41 |
| 7,447,137 B2* | 11/2008 | Morishima | .................. | 369/116 |
| 2004/0001411 A1* | 1/2004 | Morishima | ................ | 369/53.28 |
| 2006/0171272 A1* | 8/2006 | Inoue | ....................... | 369/47.32 |
| 2007/0206468 A1* | 9/2007 | Takahashi et al. | .......... | 369/53.2 |

FOREIGN PATENT DOCUMENTS

WO   WO 00/42608   7/2000

* cited by examiner

Primary Examiner—Wayne R Young
Assistant Examiner—Brenda Bernardi
(74) Attorney, Agent, or Firm—Antonelli, Terry, Stout & Kraus, LLP.

(57) ABSTRACT

In an optical disc device employing a CLV method, executing pickup return processing when focus drop occurs during recording poses problems of increased waiting time for rotation and increased focus servo recovery processing time. When defocusing occurs and focus pull-in cannot be achieved by retry, a first rotation frequency at a radial position thereof is calculated. Next, a second rotation frequency at the innermost circumferential position at the current speed is calculated. Next, a third rotation frequency at a radial position where recording is restarted after focus servo recovery is calculated. Next, a fourth rotation frequency at pickup return position at a different speed is calculated. Next, based on the relationship among the first to fourth rotation frequencies described above, a rotation speed at pickup return is selected so that a rotation frequency difference becomes the smallest in all conditions: at pickup return from defocusing, servo recovery after pickup return, and access operation after the servo recovery.

12 Claims, 5 Drawing Sheets

FOCUS SERVO RECOVERY PROCESSING METHOD FOR OPTICAL DISC DEVICE AND OPTICAL DISC DEVICE

CLAIM OF PRIORITY

The present application claims priority from Japanese application serial no. JP 2005-360662, filed on Dec. 14, 2005, the content of which is hereby incorporated by reference into this application.

BACKGROUND OF THE INVENTION

1. Field of the Invention

The present invention relates to an optical disc device, and more specifically to a focus servo recovery processing method when defocusing or focus servo omission occurs during recording operation.

2. Description of the Related Art

For an optical disc device, a DVD in particular, a CLV (Constant Linear Velocity) method which rotates the disc at a constant linear velocity is employed at the time of data recording while a CAV (Constant Angular Velocity) method which keeps the disc rotation frequency constant is employed at the time of data reproduction. In such an optical disc device, when defocusing occurs at the time of data recording, retry processing is executed in which focus servo is applied again at the radial position where the defocusing has occurred. However, in a case where focus cannot be pulled in by this retry, pickup return processing is executed in which focus servo is applied again at the innermost circumferential position of the disc.

Published Japanese translation of a PCT application 2000-42608 describes that, in an optical disc reproducing device which performs by the CLV method reproduction from an optical disc on which recording has been performed by the CLV method, rotation control of a spindle motor is performed by the CAV method during processing at the time of reproduction from start of spin-up until reaching the reading standby state, thereby eliminating the need for operation of performing pull-in again by the CLV method even when defocusing of an optical head occurs, which permits achieving shorter waiting time for disc rotation, reduced seek time for the inner and outer circumferences, stable control, and reduced spin-up time.

SUMMARY OF THE INVENTION

In Published Japanese translation of a PCT application 2000-42608, no description is provided on recovery processing performed when defocusing occurs at the time of recording, but typically as described above, retry processing is executed in which focus servo is applied again at the radial position where the defocusing has occurred, and in a case where pull-in cannot be achieved even by the retry processing, pickup return processing is executed in which a spindle motor is spun up at the speed at which the defocusing has occurred, an optical head is transferred to the innermost circumference of the disc, and focus servo is applied again. In the case of the CLV control, based on the logic of constant linear velocity, the rotation frequency is larger at a more inner circumferential side of the disc. For example, execution of the pickup return processing when defocusing occurs at the outermost circumference of the disc involves processing in which the disc is once rotated at a high speed in accordance with the rotation frequency at the inner circumference and then is rotated at a low speed again in order to access the outermost circumference, which causes problems of increased waiting time for rotation and increased focus servo recovery processing time.

It is an object of the present invention to reduce, in an optical disc device, the time required for focus servo recovery processing attributable to defocusing at the time of recording.

A representative focus servo recovery processing method for an optical disc device according to the present invention includes the steps of:

retrying the focus servo at a radial position (R) of an occurrence of defocusing when defocusing occurs during recording on an optical disc by a CLV method; calculating a rotation frequency (A) of the optical disc at the radial position (R) when the focus servo cannot be applied at the retry;

calculating a rotation frequency (B) at a position where the focus servo is retried after pickup return; calculating a rotation frequency (C) at a radial position (S) where recording is restarted after the focus servo is retried; calculating a rotation frequency (D) at a position where the focus servo is retried at a speed different from a speed at time of the recording after the pickup return; selecting a speed that provides a smallest rotation frequency difference from the rotation frequency (A) based on the rotation frequencies (A), (B), (C), and (D); applying the retry of the focus servo at the selected speed; and controlling a rotation frequency of the optical disc at the radial position (S) to become the rotation frequency (C) after the focus servo is retried The position where the focus servo is retried is preferably an inner circumferential position of the optical disc.

In the step of selecting the speed that provides the smallest the rotation frequency difference from the rotation frequency (A), a speed satisfying $((B)-(A))+((B)-(C))>((D)-(A))+((D)-(C))$ is selected.

DESCRIPTION OF THE PREFERRED EMBODIMENTS

Figure 5:
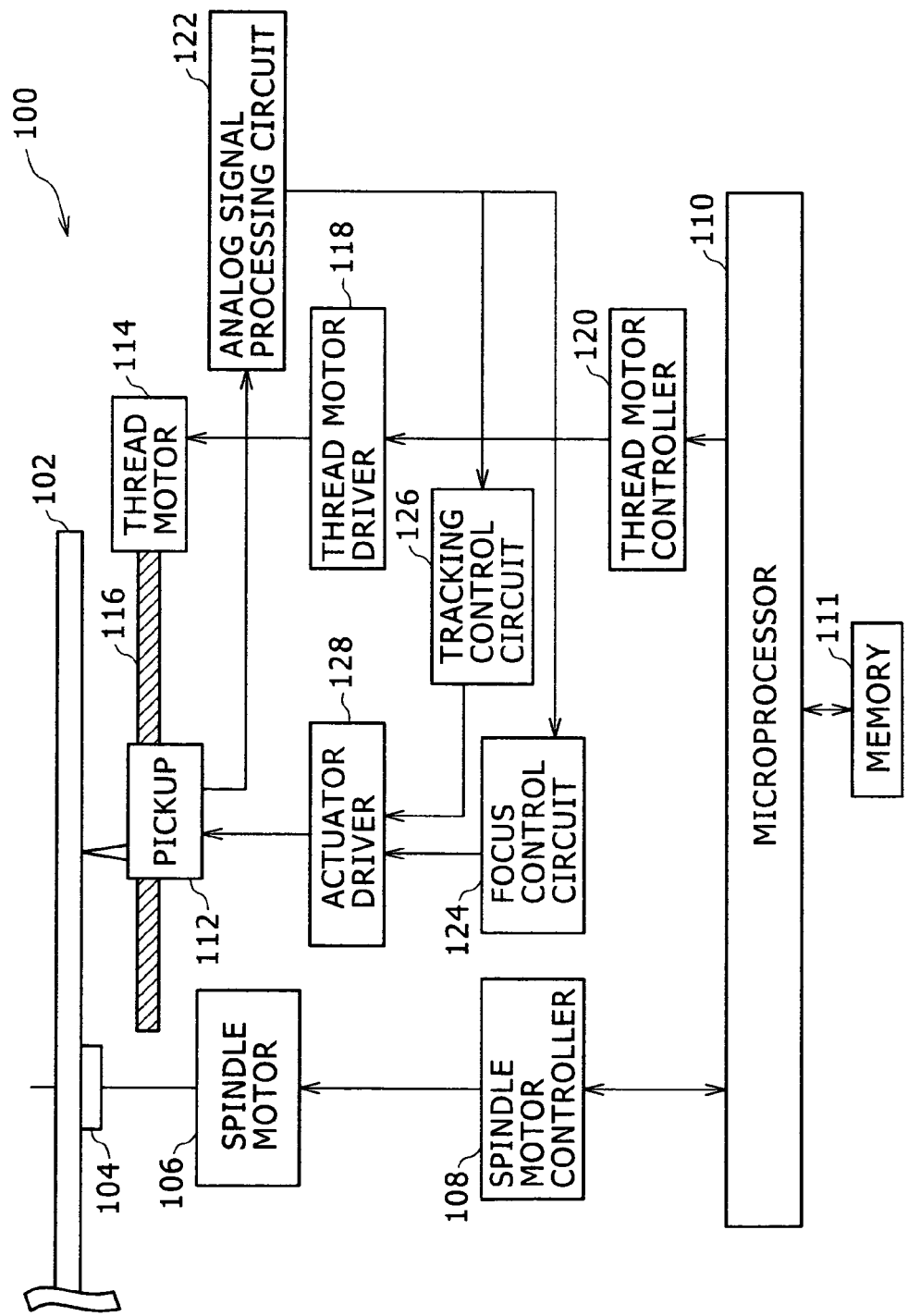
FIG. 5 is a block diagram of an optical disc device to which the spindle motor rotation control methods of the first and second embodiments are applied.

FIG. 5 is a block diagram of an optical disc device (for example, DVD) to which the present invention is applied. An optical disc device 100 performs data recording and reproduction by using a CLV method. An optical disc 102 is placed on a turntable 104, and subjected to rotation control by the CLV method by a spindle motor 106. The rotation of the spindle motor 106 is controlled by a spindle motor controller 108, which is controlled by a controller (hereinafter, referred to as microprocessor) 110. A pickup 112 as an optical head is held by a shaft 116 of a thread motor 114 and transferred in the radial direction of the disc 102 by the thread motor 114. The thread motor 114 is driven by a thread motor driver 118, which is controlled by a thread motor controller 120. The thread motor controller 120 controls the thread motor driver 118 in response to directions from the microprocessor 110. In a memory 111, a command and control data required for the control of the spindle motor controller 108 and the thread motor controller 120 by the microprocessor 110 are stored.

In the pickup 112, a laser diode, an objective lens which irradiates the optical disc with a laser beam from the laser diode and focuses the laser beam, and a photodetector for detecting reflected light from the optical disc and the like are loaded. The reflected light from the disc, which is detected by the pickup 112, is converted into an electrical signal, and outputted as a reproduced signal to an analog signal processing circuit (hereinafter, abbreviated as signal processing circuit) 122. In the signal processing circuit 122, the reproduced signal (analog signal) from the pickup 112 is digitalized and demodulated as reproduced data, and also a focus error signal and a tracking error signal are generated. The reproduced data is transmitted to a higher-level device, the focus error signal is outputted to a focus control circuit 124, and the tracking error signal is outputted to a tracking control circuit 126.

In the focus control circuit 124, the amount of focus control is generated based on the focus error signal, and in the tracking control circuit 126, the amount of tracking control is generated based on the tracking error signal. These amounts of control are outputted to an actuator driver 128, and the focusing and tracking of the pickup 112 are controlled through control of the actuator driver 128.

Figure 1:
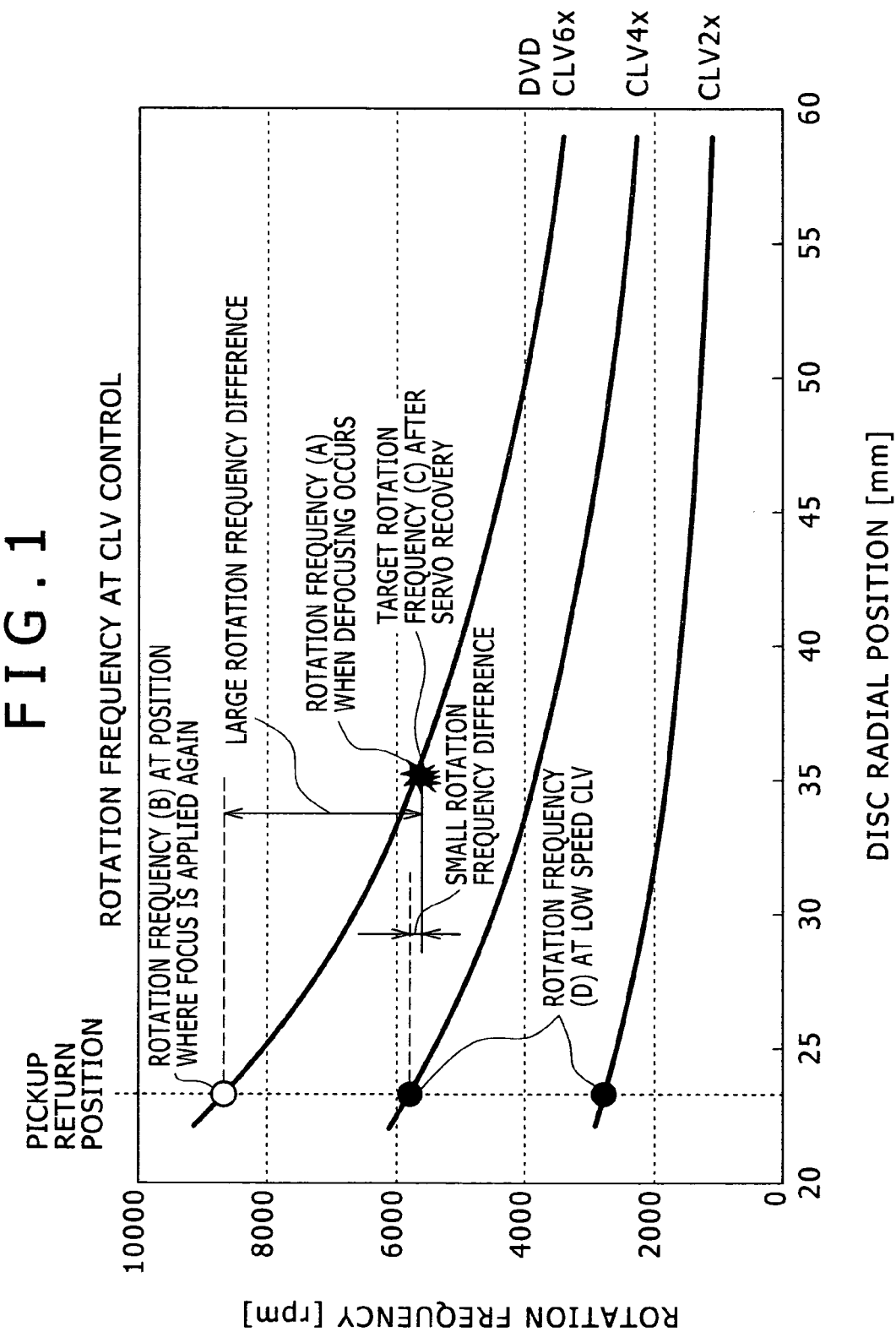
FIG. 1 a diagram for explaining a spindle motor rotation control method according to a first embodiment of the present invention.
Figure 2:
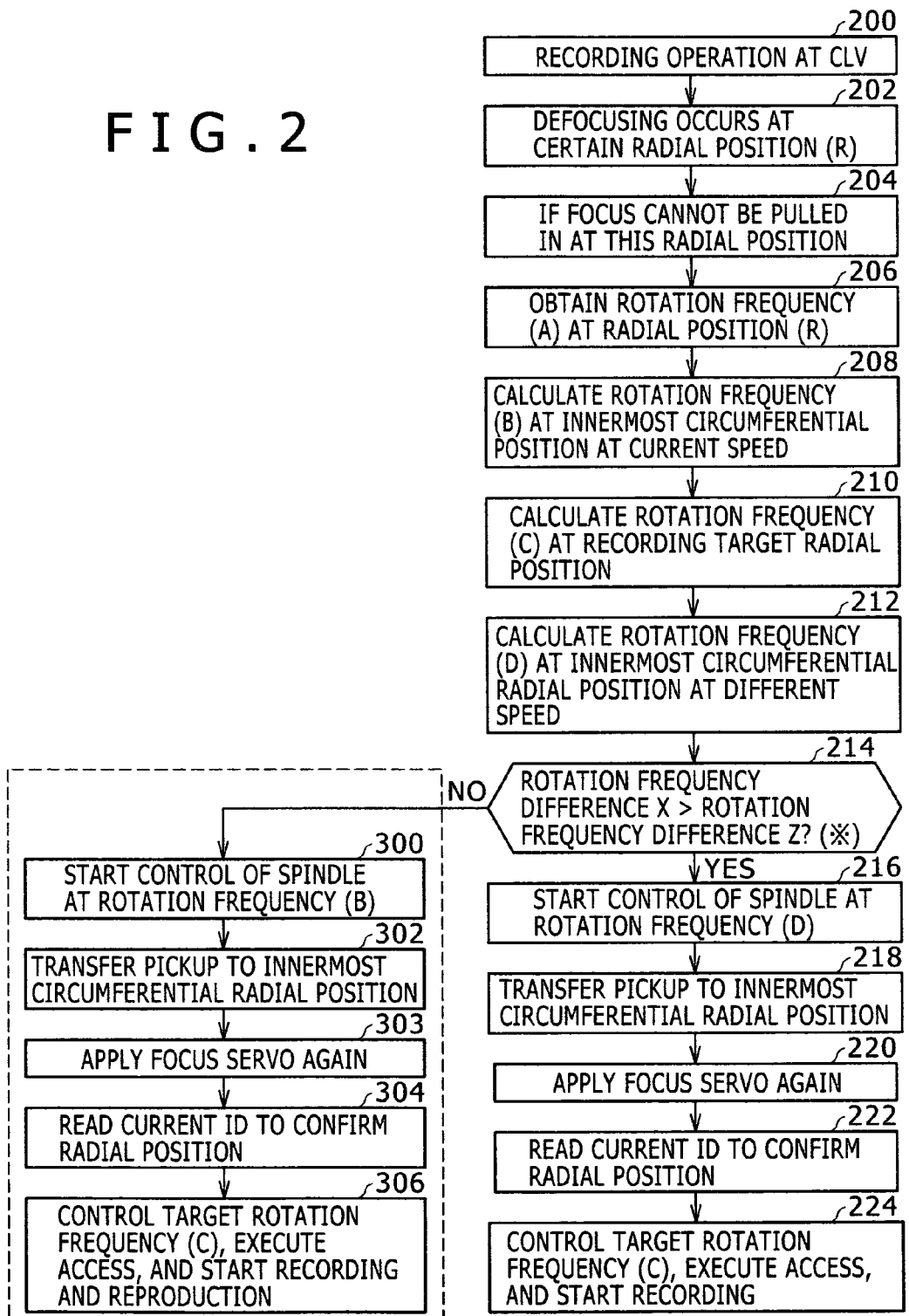
FIG. 2 is a flowchart showing procedures of focus servo recovery processing according to the first embodiment.

Next, pickup return processing (focus servo recovery processing) according to a first embodiment of the invention, which processing is executed by the optical disc device 100 described above, will be described with reference to FIGS. 1 and 2. The following processing is executed by each of the controllers under control of the microprocessor 110. A description will be given, referring to a case where, in a DVD employing the CLV method as shown in FIG. 1, when recording is performed at 6 times speed (CLV6×)(step 200), defocusing occurs near the disc radial position 35 mm (R) (step 202), thus causing the need for executing the pickup return processing. First, the pickup return processing at the CLV control has the following two limitations. The first limitation is that the current radial position needs to be confirmed by reading the ID after focus servo is applied again following the pickup return. The second limitation is that, in order to read the ID, the rotation frequency of the optical disc needs to be stabilized until reaching the rotation speed which keeps constant the linear velocity in accordance with the radial position of the optical disc with the aforementioned speed.

When defocusing has occurred (step 202), focus servo is applied again by retry at the radial position (R) where the defocusing has occurred, and if focus pull-in can be achieved, recording operation is restarted at the aforementioned speed. If focus pull-in cannot be achieved (step 204), a current rotation frequency (A) at this radial position (R) is obtained and stored into the memory 111 before performing the pickup return (step 206). The current rotation frequency (A) can be calculated by a method of measuring the encoder pulse width outputted from the spindle motor 106 or from the current radial position (R) of the pickup 112 and the rotation speed (CLV6×) currently under control. Next, a rotation frequency (B) at the position where the focus servo is applied again (the inner circumference, desirably the innermost circumference) at the current speed (CLV6×) is calculated and stored into the memory 111 (step 208). The rotation frequency (B) can be obtained from the speed currently under control since the position of the pickup at the pickup return operation is fixed. Next, a rotation frequency (C) at a target radial position (S) where the recording operation is restarted after focus servo recovery is calculated and stored into the memory 111 (step 210). The rotation frequency (C) at the restart of recording is, in many cases, equal to the rotation frequency (A) at which the defocusing has occurred. Next, a rotation frequency (D) at the pickup return position at a different speed included in this optical disc device 100 is calculated and stored into the memory 111 (step 212). In this optical disc device 100, plural recording speeds at the CLV control are provided, and the rotation frequency (D) can be calculated from the rotation frequency at the innermost circumferential position at each of the CLV speeds.

Next, in step 214, based on the relationship among the rotation frequencies (A), (B), (C), and (D) described above, the rotation speed at the pickup return is controlled so that the rotation frequency difference becomes smallest in all the conditions: at the pickup return from the defocusing, the servo recovery after the pickup return, and access operation after the servo recovery. More specifically, rotation frequency difference $X((B)-(A))+((B)-(C))$>rotation frequency difference $Z((D)-(A))+((D)-(C))$ is judged, and the speed is selected which results in the rotation frequency (D) having the smallest rotation frequency difference. In the example of FIG. 1, since the conditions described above are satisfied, the rotation frequency (D) at the innermost circumferential position is the closest to the rotation frequency (A) at the focus servo drop; that is, 4 times speed (CLV4×) is selected. Next, the rotation frequency of the spindle motor 106 is so controlled as to become equal to the rotation frequency (D) at the innermost circumferential position, i.e., 4 times speed (step 216), the pickup 112 is transferred to the innermost circumference radial position of the disc 102 (step 218), and focus servo is applied again under control of the focus control circuit 124 (step 220). Subsequently, at 4CLVX, the ID is read at the innermost circumference to confirm the radial position (step 222). When the radial position is confirmed, the spindle motor 106 is so controlled as to become equal to 6 times speed (CLV6×) at the target rotation frequency (C), the pickup 112 is transferred to the radial position (S), and then recording operation is restarted (step 224).

According to the control method described above, in a series of operations from the defocusing, the pickup return, the servo recovery, and the recording restart, the rotation frequency difference at the time of rotation frequency control of the spindle motor is small, which permits reduction in the time required until rotation frequency stabilization, thus permitting reduction in the time required for the focus servo recovery processing.

In the case of defocusing occurring near a disc radial position 55 mm of FIG. 1, it can be found that 2 times speed (CLV2×) provides the smallest rotation frequency difference of the spindle motor to be controlled for the focus servo recovery processing. Moreover, if the condition of rotation frequency difference $((B)-(A))+((B)-(C))$>rotation frequency difference $Z((D)-(A))+((D)-(C))$ is not satisfied in step 214 of FIG. 2, as shown in steps 300 to 306, the focus servo recovery processing is performed at this times speed (CLV6×). That is, the rotation frequency of the spindle motor 106 is so controlled as to become equal to the rotation frequency (B) (step 300), the pickup 112 is transferred to the innermost circumferential radial position of the disc (step 302), and focus servo is applied again at this position (step 303). If the rotation frequency of the spindle motor 106 is stabilized and the focus servo succeeds, the ID is read to confirm the current radial position (step 304). Subsequently, the spindle motor 106 is so controlled as to become equal to the target rotation frequency (C) at the original radial position, the pickup 112 is transferred to the original radial position, and recording is restarted (step 306).

Figure 3:
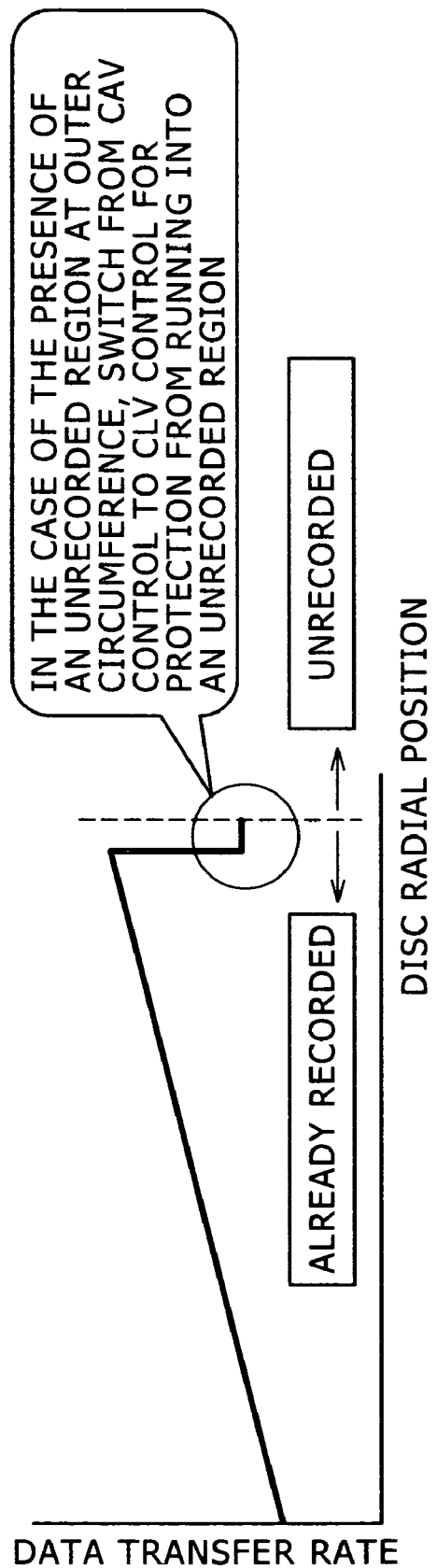
FIG. 3 is a diagram showing a switching point of a rotation control method according to a second embodiment.

Next, referring to FIGS. 3 and 4, a second embodiment of the invention will be described. The first embodiment described above refers to the rotation control method of the spindle motor in the case of defocusing, and this control method is applicable at both switching from the CAV method to the CLV method and switching from the CLV method to the CAV method. In the case of DVD+RW, it is designed so that recording can be ended without finalization. Thus, the optical disc 102 which has performed recording by this method starts reproduction by the CAV method, but performs processing of switching to the CLV method before running into an unrecorded region located at the outer circumference. The CAV method employs a phase difference method (DPD) for a tracking detection method, and thus can obtain an error signal only from an already recorded region. On the contrary, the CLV method employs a push-pull method (DPP), and thus can apply tracking servo even to an unrecorded part. Therefore, when it is previously known that there is an unrecorded part at the outer circumference, processing of switching from the CAV method to the CLV method is performed for protection from running into the unrecorded part. Now, following the servo mode switching, focus servo by the CAV method is dropped and focus servo by the CLV method is applied again. Since the pickup return processing is also executed in such a case, the rotation frequency is found and appropriate speed control is performed, thereby permitting reduction in the rotation frequency difference, which in turn permits reduction in the switching processing time.

Figure 4:
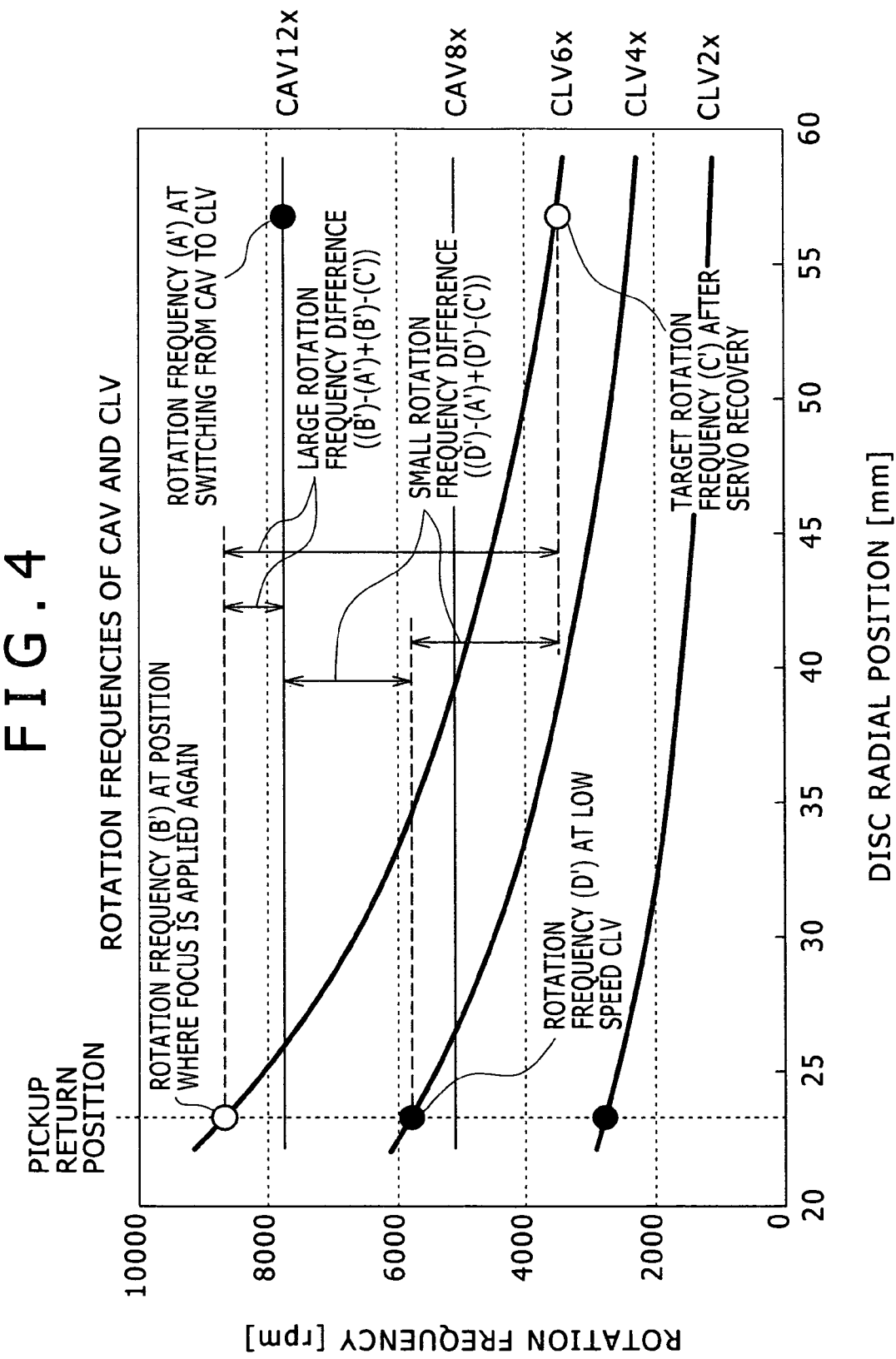
FIG. 4 is a diagram for explaining a spindle motor rotation control method according to the second embodiment.

Referring to FIG. 4, the detailed processing of the second embodiment will be described. When recording from the inner circumference toward the outer circumference is executed by the pickup 112 on the optical disc 102 whose rotation is controlled by the CAV method at 12 times speed (CAV12×), if switching from the CAV method to the CLV method occurs near the disc radial position (R') 57 mm, a rotation frequency (A') of the spindle motor 106 in this condition is calculated by measuring the encoder pulse width outputted from the spindle motor 106, and stored into the memory 111. Next, a target rotation frequency (C') by the CLV method (6 times speed) after focus servo recovery and a rotation frequency (B') at the position (the innermost circumference) where focus servo at this speed (CLV6×) is applied again are calculated, and stored into the memory 111. Next, a rotation frequency (D') at the pickup return position at a speed (CLV4×) lower than the target speed (CLV6×) is calculated, and stored into the memory 111.

The microprocessor 110 judges, based on the rotation frequencies described above which are stored in the memory 111, rotation frequency difference X'((B')−(A'))+((B')−(C'))>rotation frequency difference Z' ((D')−(A'))+((D')−(C')). If the condition described above is satisfied, the rotation frequency of the spindle motor 106 is controlled at the rotation frequency (D'), the pickup 112 is transferred to the innermost circumferential position of the disc, and focus servo is applied again. Subsequently, the ID is read to confirm the current radial position, and if the ID is confirmed, the rotation frequency of the spindle motor 106 is controlled at the rotation frequency (C') at the target speed (CLV6×), the pickup 112 is transferred to the original position near the radial position (R') 57 mm, and recording operation is restarted.

Also in the second embodiment described above, the rotation frequency difference to be controlled can be reduced, thus permitting reduction in the focus servo recovery processing time at switching of the rotation method.

What is claimed is:

1. A focus servo recovery processing method for an optical disc device, comprising the steps of:
   retrying the focus servo at a radial position (R) of an occurrence of defocusing when defocusing occurs during recording on an optical disc by a CLV method;
   calculating a rotation frequency (A) of the optical disc at the radial position (R) when the focus servo cannot be applied at the retry;
   calculating a rotation frequency (B) at a position where the focus servo is retried after pickup return;
   calculating a rotation frequency (C) at a radial position (S) where recording is restarted after the focus servo is retried;
   calculating a rotation frequency (D) at a position where the focus servo is retried at a speed different from a speed at time of the recording after the pickup return;
   selecting a speed that provides a smallest rotation frequency difference from the rotation frequency (A) based on the rotation frequencies (A), (B), (C), and (D);
   applying the retry of the focus servo at the selected speed; and
   controlling a rotation frequency of the optical disc at the radial position (S) to become the rotation frequency (C) after the focus servo is retried.

2. The focus servo recovery processing method for an optical disc device according to according to claim 1,
   wherein the position where the focus servo is retried is an inner circumferential position of the optical disc.

3. The focus servo recovery processing method for an optical disc device according to claim 1,
   wherein, in the step of selecting the speed that provides the smallest rotation frequency difference from the rotation frequency (A), a speed satisfying ((B)−(A))+((B)−(C))>((D)−(A))+((D)−(C)) is selected.

4. A focus servo recovery processing method for an optical disc device, comprising the steps of:
   calculating a rotation frequency (A') of the optical disc at a radial position (R') of an occurrence of switching to CLV method when switching to a CLV method occurs while recording is executed on an optical disc from inner circumference toward outer circumference by a CAV method;
   calculating a target rotation frequency (C') after focus servo is retried by the CLV method and a rotation frequency (B') at a position where the focus servo is retried at a speed thereof;
   calculating a rotation frequency (D') at a position where the focus servo is retried at a speed lower than a target speed;
   selecting a speed that provides a smallest rotation frequency difference from the rotation frequency (A) based on the rotation frequencies (A'), (B'), (C'), and (D');
   retrying the focus servo at the selected speed; and
   controlling a rotation frequency of the optical disc at the radial position (R') to become the rotation frequency (C') after the focus servo is retried.

5. The focus servo recovery processing method for an optical disc device according to claim 4,
   wherein the position where the focus servo is retried is an inner circumferential position of the optical disc.

6. The focus servo recovery processing method for an optical disc device according to claim 4,
   wherein, in the step of selecting the multiple speed that provides the smallest the rotation frequency difference from the rotation frequency (A), the speed satisfying ((B')−(A'))+((B')−(C'))>((D')−(A'))+((D')−(C')) is selected.

7. An optical disc device, comprising:

a spindle motor that rotates an optical disc inserted;

a spindle motor controller that controls a rotation frequency of the spindle motor;

a pickup that irradiates the optical disc with a laser beam to record data, detects reflected light from the optical disc, and outputs a reproduced signal;

a signal processing circuit where the reproduced signal from the pickup is input and a focus error signal of the pickup is output; and a focus control circuit that controls focus of the pickup based on the focus error signal from the signal processing circuit, wherein, when defocusing occurs during recording on the optical disc by a CLV method, processing of retrying of the focus servo at a radial position (R) thereof is executed, when the focus servo cannot be retried at the processing, a rotation frequency (A) of the optical disc at the radial position (R) is calculated; a rotation frequency (B) at a position where the focus servo is retried after pickup return is calculated; a rotation frequency (C) at a radial position (S) where recording is restarted after the focus servo is applied again is calculated; a rotation frequency (D) at a position where the focus servo is retried after pickup return at a speed different from a speed at time of the recording is calculated; a speed that provides a smallest rotation frequency difference from the rotation frequency (A) is selected based on the rotation frequencies (A), (B), (C), and (D); the focus servo is retried at the selected speed; after the focus servo is retried, a rotation frequency of the optical disc is controlled at the rotation frequency (C), and recording is restarted at the radial position (S).

8. The optical disc device according to claim 7, wherein the position where the focus servo is retried is an inner circumferential position of the optical disc.

9. The optical disc device according to claim 7, wherein the speed that provides the smallest rotation frequency difference from the rotation frequency (A) is a speed satisfying $((B)-(A))+((B)-(C))>((D)-(A))+((D)-(C))$.

10. An optical disc device, comprising:

a spindle motor that rotates an optical disc inserted;

a spindle motor controller that controls a rotation frequency of the spindle motor;

a pickup that irradiates the optical disc with a laser beam to record data, detects reflected light from the optical disc, and outputs a reproduced signal;

a signal processing circuit where the reproduced signal from the pickup is input and a focus error signal of the pickup is output; and a focus control circuit that controls focus of the pickup based on the focus error signal from the signal processing circuit, wherein, when switching to a CLV method occurs while recording is executed on the optical disc from inner circumference to outer circumference by a CAV method, a rotation frequency (A') of the optical disc at a radial position (R') thereof is calculated; a target rotation frequency (C') after focus servo is retried by the CLV method and a rotation frequency (B') at a position where the focus servo is retried at a speed thereof are calculated; a rotation frequency (D') at a position where the focus servo is retried at a speed lower than a target speed is calculated; a speed that provides a smallest rotation frequency difference from the rotation frequency (A') is selected based on the rotation frequencies (A'), (B'), (C'), and (D'); the focus servo is retried at the selected speed; a rotation frequency of the optical disc is controlled at the rotation frequency (C') after the focus servo is retried; and recording is restarted at the radial position (R').

11. The optical disc device according to according to claim 10, wherein the position where the focus servo is retried is an inner circumferential position of the optical disc.

12. The optical disc device according to claim 10, wherein the speed that provides the smallest the rotation frequency difference from the rotation frequency (A') is a speed satisfying $((B')-(A'))+((B')-(C'))>((D')-(A'))+((D')-(C'))$.

* * * * *